2 Sheets—Sheet 1.

J. YERKES.
MANUFACTURE OF ADZE-EYE HAMMER.

No. 183,096.  Patented Oct. 10, 1876.

Witnesses:
Lewis F. Brous
A. P. Grant

Inventor:
Jonathan Yerkes
by John A. Wiedersheim
Atty.

J. YERKES.
MANUFACTURE OF ADZE-EYE HAMMER.

No. 183,096. Patented Oct. 10, 1876.

Witnesses:
Lewis F. Brous
A. P. Grant.

Inventor:
Jonathan Yerkes.
by John A. Diaterheim
att'y.

JAMES R. OSGOOD & CO. BOSTON.

UNITED STATES PATENT OFFICE.

JONATHAN YERKES, OF PHILADELPHIA, PENNSYLVANIA.

IMPROVEMENT IN THE MANUFACTURE OF ADZ-EYE HAMMERS.

Specification forming part of Letters Patent No. 183,096, dated October 10, 1876; application filed December 29, 1875.

*To all whom it may concern:*

Be it known that I, JONATHAN YERKES, of the city and county of Philadelphia, and State of Pennsylvania, have invented a new and useful Improvement in the Manufacture of Adz-Eye Hammers; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
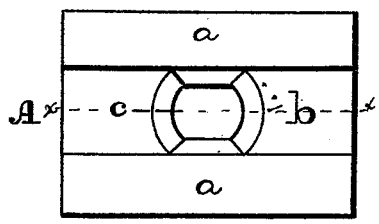
Figure 2:
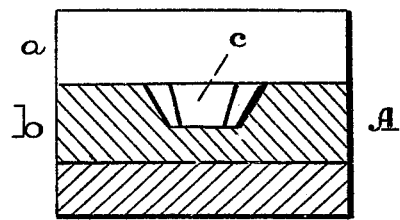
Figure 3:
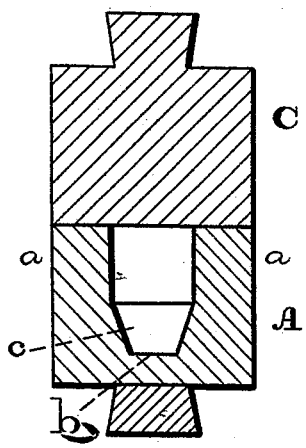
Figure 4:
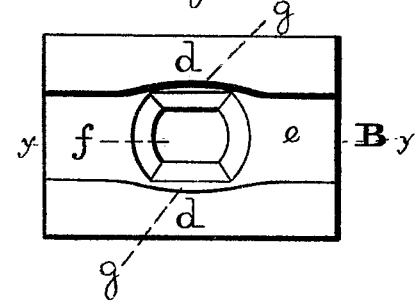
Figure 5:
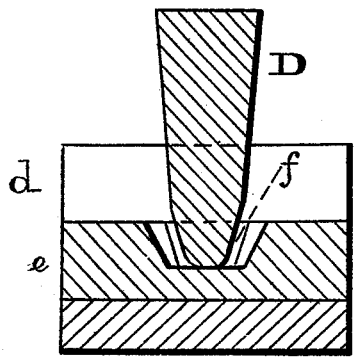
Figure 6:
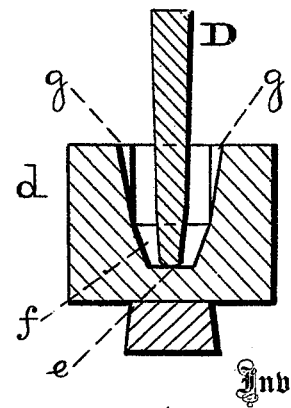

Figure 1 is a top view of one of the lower dies employed in the manufacture. Fig. 2 is a longitudinal section thereof, in line $xx$, Fig. 1. Fig. 3 is a transverse section thereof, and of the upper die. Fig. 4 is a top view of another die. Fig. 5 is a longitudinal section thereof, in line $yy$, Fig. 4, and of a punch employed. Fig. 6 is a transverse section thereof. Figs. 7 to 14, inclusive, represent successive operations.

Similar letters of reference indicate corresponding parts in the several figures.

The invention consists in the manufacture of adz-eye hammers by means of a series of dies, constructed and operating as hereinafter specified.

Referring to the drawings, A represents a die, consisting of the side walls $a$, projecting upward from the bed $b$, in which is a depression, $c$, of conical form. B represents another die, which is constructed with upwardly-projecting walls $d$, bed $e$, and depression $f$, and has on the inner faces of the side walls, at opposite points, swells $g$. C represents the upper die of the die A, its working face being flat, and D represents a punch, which is of tapering form, and is employed in connection with the die B.

Figure 7:
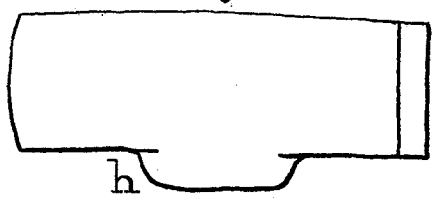
Figure 8:
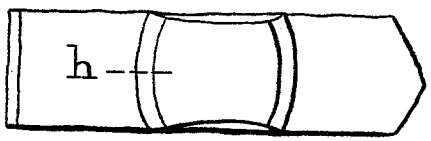
Figure 9:
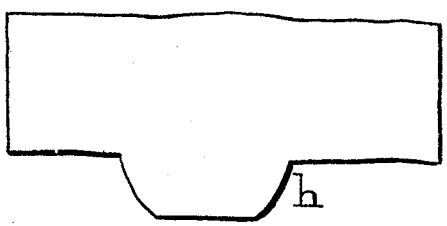
Figure 10:
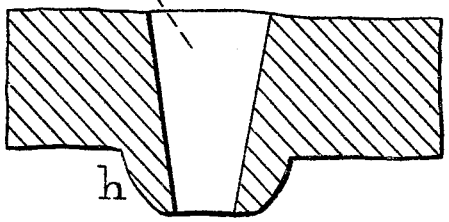
Figure 11:
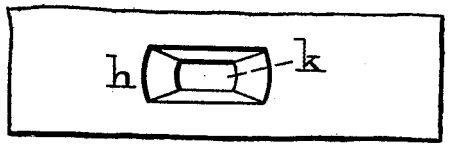
Figure 12:
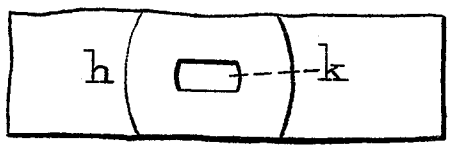
Figure 13:
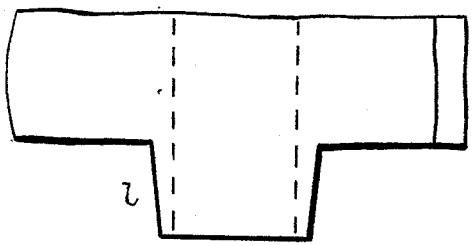
Figure 14:
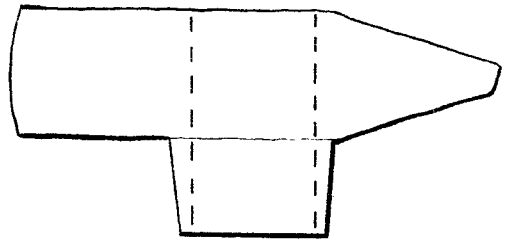

The operation is as follows: A quadrilateral bar of metal, or blank of dimensions corresponding to the size of the hammer to be formed, is placed on the bed $a$ of the die A, and power applied to the upper die C, whereby some of the metal at the lower side of the bar will be forced into the depression $c$, and assume the shape thereof, or an eye-form, $h$, as shown in Figs. 7 and 8. The shaped bar is then placed on the bed of the die B, and power applied to the punch D, whereby the eye-form $h$ will be elongated, and a taper-shaped eye, $k$, will be formed in the bar, extending from the top of the bar to the bottom of the eye-form $h$. (See Figs. 9 and 10.) As the punch descends, the sides of the metal will bulge, and this is provided for in the walls $d$ by the swells $g$.

It will be observed that in the eye-form $h$ there is left a large stock of metal surrounding the lower portion of the eye $k$, said portion being the narrowest of the eye. This provision is of the utmost importance, for when the eye-form is to be worked or drawn out into an adz-eye, (shown at $l$, Fig. 13,) there is employed a punch whose sides are parallel, or nearly parallel, to form the eye of the hammer. (Shown in dotted lines, Fig. 13.) Consequently, when the punch enters the tapering eye $k$, Fig. 10, and advances through the same, the metal or stock is ample, so as to be driven ahead or drawn out by the punch that forms the eye proper of the hammer, thus producing a properly and fully formed adz-eye, both inside and outside, or, in other words, working down the eye-form $h$ to a fully-formed adz-eye, $l$, and producing the eye of the hammer. The subsequent formation of the claw of the hammer, Fig. 14, and the finishing processes, are well known, and need not be stated at this time.

Having thus described my invention, what I claim as new, and desire to secure by Letters Patent, is—

For the manufacture of adz-eye hammers, the series of dies A, C, B, and D, constructed and operating substantially as shown and described.

JONATHAN YERKES.

Witnesses:
 JOHN A. WIEDERSHEIM,
 H. E. HINDMARSH.